United States Patent
Iwasaki et al.

(10) Patent No.: US 6,299,972 B1
(45) Date of Patent: *Oct. 9, 2001

(54) MICROCAPSULE MAGNETIC DISPLAY SHEET AND A METHOD THEREOF

(75) Inventors: Takashi Iwasaki; Sadatoshi Igaue; Tutomu Saito, all of Fuchu (JP)

(73) Assignee: Chemitech, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/109,833

(22) Filed: Jul. 2, 1998

(30) Foreign Application Priority Data

Jul. 7, 1997 (JP) .................................................... 9-180857

(51) Int. Cl.$^7$ ................................. B32B 5/16; C08F 2/48
(52) U.S. Cl. ........................ 428/323; 428/327; 428/335; 427/487; 427/493; 427/508; 427/521; 427/541; 427/542; 427/558; 427/559
(58) Field of Search .................................... 428/323, 327, 428/335; 427/487, 493, 508, 521, 541, 542, 558, 559

(56) References Cited

U.S. PATENT DOCUMENTS

| 4,283,438 | * | 8/1981 | Lee | 427/47 |
| 5,057,363 | * | 10/1991 | Nakanishi | 428/321 |
| 5,151,032 | * | 9/1992 | Igawa | 434/409 |
| 5,411,398 | * | 5/1995 | Nakanishi et al | 434/409 |
| 5,674,104 | * | 10/1997 | Ohashi et al. | 446/132 |
| 5,972,493 | * | 10/1999 | Iwasaki et al. | 428/323 |

FOREIGN PATENT DOCUMENTS

| 01085268 | 3/1989 | (JP) . |
| 05069502 | 3/1993 | (JP) . |
| 07059626 | 7/1995 | (JP) . |
| 07182695 | 7/1995 | (JP) . |
| 08297470 | 12/1996 | (JP) . |

* cited by examiner

*Primary Examiner*—Hoa T. Le
(74) *Attorney, Agent, or Firm*—Anderson, Kill & Olick P.C.

(57) ABSTRACT

The microcapsule magnetic display sheet is sequentially provided thereon with a transparent front sheet, a microcapsule layer coated on the transparent front sheet and then a ultraviolet ray curable resin layer. The ultraviolet ray curable resin layer is formed by painting liquid ultraviolet raycurable resin on the microcapsule layer first and then hardening it by irradiating it with UV rays. As the liquid ultraviolet ray curable resin can fill fine gaps of the microcapsules, no hollows left between the microcapsules and the UV resin layer. As the UV resin filled in gaps shares wording pressure, the microcapsules are fully protected and hardly be destroyed. After painting the liquid UV ray curable resin on the microcapsule layer and before it IS hardened, a separable film is covered on it. While a film is covered on it, the sheet is hard and if the film is separated, the sheet is soft. So the stiffness of the magnetic display sheet can be regulated by covering or not covering a film.

5 Claims, 3 Drawing Sheets

MICROCAPSULE MAGNETIC DISPLAY SHEET AND A METHOD THEREOF

FIELD OF THE INVENTION

The invention relates to a magnetic display sheet and a method there of, and more particularly, to a microcapsule magnetic display sheet having a ultraviolet ray curable resin layer which has elasticity so as to endow the magnetic sheet with impact resistance and durability.

The magnetic display sheet thus manufactured has such properties as softness or stiffness, is very strong against impact and can distinctly record words or pictures.

DESCRIPTION OF THE PRIOR ART

Many methods of magnetic display are well known so far, for example, a method of sealing fine ball-shaped magnetic powders and titanium oxide particles in microcapsules, moving the magnetic powders in the microcapsules to front to make display by a magnetic field force is published recently. The magnetic display sheet used in this method is composed of a transparent front sheet, a back sheet which is not always necessary to be transparent and a microcapsule layer between the said two sheets. FIG. 5 shows a cross sectional view of the traditional magnetic display sheet. The microcapsule magnetic display sheet 1 in FIG. 5 is prepared by a process of painting microcapsule dispersoid on a transparent front sheet 1, then drying it to form a microcapsule layer 31, and at last sticking a back sheet 21 closely to the microcapsule layer to complete it.

There are some problems in the traditional magnetic display methods now. While using a magnetic pen (magnetic flux density 850±100 gauss) sold on the market to write words or to draw pictures on the microcapsule magnetic sheet shown in FIG. 5, the words or pictures are not distinct sometimes and afterimages leave somehow even the words or pictures are deleted.

And according to its constitution, the back sheet 21 is stuck onto t he microcapsule layer 31 in order to protect it, but the microcapsule layer is not very even as the microcapsules have different sizes.

As a result, hollows 22 between the back sheet 21 and the microcapsule layer 31 generate and the hollows 22 result in microcapsules transformed or destroyed gradually inrepeated wording or drawing.

Therefore, the traditional magnetic display sheet does not have satisfactory impact resistance and desirable durability.

And, while sticking the back sheet 21 onto the microcapsule layer 31 for preparing the microcapsule magnetic sheet, a kind of adhesive is pre-coated on the back sheet 21 to stick it onto the microcapsule layer 31.

But while sticking the back sheet 21 onto the microcapsule layer, the hollows 22 generate inevitably because the adhesive does not match the microcapsules very well in all the case.

And as the adhesive is point-adhered to the microcapsules, the adhesion is not strong enough and as a result, the back sheet 21 is partially or completely separated from the microcapsule layer sometimes.

Furthermore, as the microcapsule sheet 1 with a back sheet stuck thereon is stiff, it is necessary to stick an unwoven cloth instead of the back sheet if a soft microcapsule sheet is necessary.

And as different adhesives are necessary to be pre-painted on the different back materials, namely sheet or unwoven cloth, the different process results in production efficiency down.

Therefore, the inventors of the invention, based on repeated researches, discovered that a microcapsule magnetic sheet with good durability and impact resistance may be obtained by painting liquid ultraviolet ray(UV ray) curable resin on the microcapsule layer 31 and drying it instead of the traditional back sheet 21.

The reason for the merits can be considered as while painting the UV ray curable resin on the microcapsule layer, no hollows 22 generate and the UV ray curable resin can protect the microcapsule layer well from wording or drawing pressure.

And, production efficiency of the microcapsule display sheet is also essentially improved because the microcapsule display sheet having softness or stiffness can be produced by a process of covering or not covering a sheet onto the coated UV resin only.

The present inventions are the results of these discoveries.

A BRIEF DESCRIPTION OF THE INVENTION

Therefore, the first object of the invention is to provide a microcapsule display sheet which has very good durability and impact resistance, can display stable and distinct words or pictures at normal wording or drawing speed and the recorded words or pictures can be deleted speedily without afterimage left.

The second object of the invention is to provide a method of manufacturing the said microcapsule display sheet.

The third object of the invention is to provide a method for manufacturing a microcapsule display sheet with softness or stiffness by a simple process.

The objects of the inventions are accomplished by the means as follows.

1. Microcapsule magnetic display sheet sequentially provided thereon with a transparent sheet; a microcapsule layer; and an ultraviolet-ray curable resin layer.
2. Microcapsule magnetic display sheet according to item 1, wherein said ultraviolet-ray curable layer is in a thickness of 20 $\mu$m to 500 $\mu$m.
3. A method of manufacturing the microcapsule magnetic display sheet is composed of processes as:
   (1) coating microcapsule dispersoids on a transparent sheet,
   (2) drying it to form a microcapsule layer and,
   (3) coating liquid ultraviolet-ray curable resin on the microcapsule dispersoid layer and irradiating it with UV rays just after coating to harden it so as to form a UV ray curable resin layer.
4. A method of manufacturing the microcapsule magnetic display sheet according to item 3, wherein a film is covered on the coated liquid UV ray curable resin before it is hardened.
5. A method of manufacturing the microcapsule magnetic display sheet according to item 4, wherein said film covered on the UV curable resin is separable.

As the invented microcapsule display sheet is sequentially provided thereon with a transparent surface sheet, a microcapsule layer coated on the surface sheet and a UV resin layer coated on the microcapsule layer, owing to the existence of the UV resin layer, while wording with a magnetic pen at normal wording speed, distinct and clear lines or pictures(or images) can be recorded and while erasing, the wording lines are completely erased and no lines left. And, the microcapsule display sheet is very good in durability and impact resistance.

In the present invention, the UV resin layer with thickness of 20 $\mu$m to 500 $\mu$m protects the microcapsules from pressure, impact or moisture.

According to the method for manufacturing the microcapsule display sheet, coating microcapsule dispersoid on a transparent sheet, drying it to form a microcapsule layer, then coating liquid UV resin on the dried microcapsule layer and irradiating it with UV lamps to harden it, as the liquid UV resin fills into fine gasp between the microcapsules, the capsules are completely protected and that results in good durability and good impact resistance.

In more detail, as no gaps formed between the microcapsules and the UV resin, the wording pressure is shared by the UV resin but not all suffered by the microcapsules.

Also according to the present invention, after coating the liquid UV resin on the microcapsule layer and before hardening it, covering a sheet on the UV resin to make it more smooth and stiff.

While the covered sheet separated the display sheet becomes soft.

A DESCRIPTION OF THE INVENTION

Figure 1:
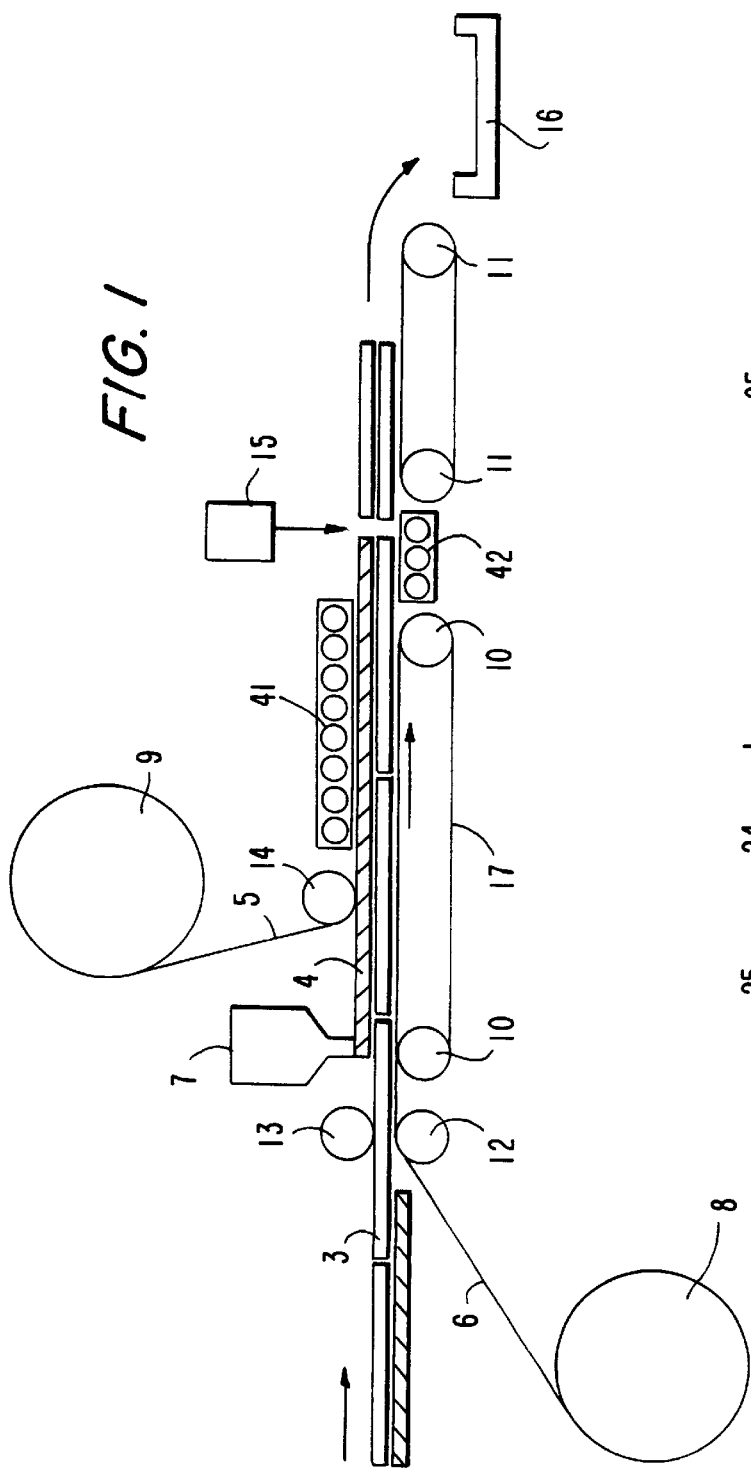
FIG. 1 is a cross sectional view of manufacture process of the invented microcapsule display sheet.

The invention will be described fully as follow.

The microcapsule magnetic display sheet is sequentially provided thereon with a transparent sheet; a microcapsule dispersoid layer; and an ultraviolet-ray curable resin layer.

Owing to the existence of the ultraviolet ray curable resin layer, the invented microcapsule display sheet has good impact resistance and durability and can stably distinctly record lines and the recorded words or pictures can be deleted completely without after images left.

The coated ultraviolet ray curable resin in thickness of 20 $\mu$m to 500 $\mu$m is efficient enough to protect the microcapsule layer from the wording pressure, impact and moisture.

As the microcapsules are protected by the UV ray curable resin layer and few of them is destroyed during repeated use, the display sheet has wonderful durability and impact resistance.

According to the invented method of manufacturing the microcapsule display sheet, painting microcapsule dispersoids on a transparent front sheet and drying it to form a microcapsule layer and then painting liquid ultraviolet ray curable resin on the microcapsule layer and hardening it by irradiating with UV rays.

Because the liquid ultraviolet ray curable resin fills in fine gaps, no hollows left between the microcapsule layer and the ultraviolet layer and the ultraviolet ray curable resin filled into fine gaps shares the wording pressure so as to protect the microcapsules. So the problems the traditional microcapsule display sheet are solved once and for all, the invented microcapsule display sheet having good durability and impact resistance is thus manufactured.

Also according to the invented method of manufacturing the microcapsule display sheet, after painting liquid ultraviolet ray curable resin on the microcapsule layer, covering a sheet on the ultraviolet ray curable resin to make the surface smooth and stiff, and the stiffness of the microcapsule display sheet may be regulated by covering a sheet with different thickness.

If the microcapsule display sheet with the covered sheet thereon,it is hard and stiff. But as the covered sheet is separable, it can be separated if necessary and once the covered sheet is separated the microcapsule display sheet becomes soft.

The ultraviolet ray curable resin used for the present invention are not specially limited. The resin synthesized from diisocyanate and (meta)acrylic monomer having a hydroxyl group at end is desirable.

Ethylene diisocyanate, propylene diisocyanate, pentamethylene diisocyanate, hexamethylene diisocyanate, 2,4-tolylene diisocyanate, 2,6-tolylene diisocyanate, isophorone diisocyanate, xylene-1,4-diisocyanate, xylene-1,3-diisocyanate may be pointed out as examples of the diisocyanate. Mixtures of the diisocyanate pointed above may also be used.

2-Hydroxy-ethyl-(meta)acrylate, 2-hydroxy-propyl-(meta)acrylate, 2-hydroxy-(meta)acrylate, 2-hydroxy-phonoxy-ethyl-(meta)acrylate may be the examples of the acrylic monomer having a hydroxyl group at end.

One kind or mixtures of them can be used. The acrylic monomer means both of acrylic monomer and methacrylic monomer.

The UV resin layer in the invented microcapsule display sheet is formed by coating liquid UV curable resin on the microcapsule layer and then hardening it by irradiating UV rays. The liquid UV curable resin may also be composed of UV resin and, reaction accelerators, radical polymerization inhibitors, plasticisers etc. Benzoin, benzoin-methylether, benzylbenzophenone, acetophenone may be pointed out as the UV polymerization initiator.

These UV resin, UV polymerization initiators, accelerators etc. are well known in the technical field.

Any suitable one besides those pointed above can be selected.

Known methods of coating the UV curable resin in the technical field are suitable for use.

The front sheet used in the present invention is transparent and each of microcapsule dispersoid, gelatin membrane or microcapsule layer can be colored by adding coloring agents.

Also the back sheet can be colored. Normal coloring agents or pigments can be used and methylene blue, Congo red, benzoin yellow TZ, oil blue, oil green, oil yellow, benzidine yellow are the examples.

The invented method of manufacturing the microcapsule display sheet is composed of the processes of painting microcapsule dispersoid on a transparent front sheet, drying itto form a microcapsule layer, then painting liquid UV resin on the microcapsule layer, covering a sheet before hardening the UV resin and last irradiating UV rays to harden it so as to complete the microcapsule sheet.

The transparent front sheet in the present invention is not too soft and not too thin, it has a suitable thickness and stiffness so as to bear wording pressure.

The transparent sheet made of polyester, polyethylene may be used but they are not the all. And thickness of the front sheet is 30 μm to 250 μm in general, 50 μm to 200 μm is desirable, 50 μm to 150 μm is the best. Thickness of the UV resin layer is the meaning of from the low point of a hollow.

Thickness of the coated UV curable resin is 20 μm to 500 μm, 50 μm to 400 μm is desirable and 100 μm to 300 μm is the best.

Thickness of the UV resin layer thinner than 20 μm is too thin that can not protect the microcapsules fully and the thickness thicker than 500 μm is too thick that makes bad influence on magnetic flux and erasion and furthermore it is not economic.

According to the invented method of manufacturing the microcapsule display sheet, the microcapsule dispersoid is prepared by dispersing microcapsules in a transparent aqueous adhesive.

Viscosity of the microcapsule dispersoid has to be suitable for being coated on the transparent front sheet. If the viscosity of the microcapsule dispersoids coated on the front transparent sheet is too low, this will result in the recorded words or pictures not being distinct and/or being unclear clear.

On the other hand, the microcapsule dispersoid having too high viscosity can not be painted on the front sheet smoothly. Of course the viscosity is different depending on circumstance temperature, season etc. 15,000 cps to 35,000 cps may be suggested.

While regulating the viscosity of the microcapsule dispersoid, sodium alginate, polyvinyl alcohol, modified polyacrylic sodium, modified polyacrylic emulsion, modified polyacrylic sulfonate may be added into the microcapsule dispersoid to regulate the viscosity.

And sodium alginate, polyvinyl alcohol are better. The adding quantity of the viscosity regulators depends on the circumstance temperature, moisture etc. 0.5 to 3.0 wt % of the microcapsule dispersoid is suggested.

The invented method of manufacturing the microcapsule display sheet is composed of the processes of coating microcapsule dispersoid on a transparent front sheet, drying it to form a microcapsule layer, then painting liquid UV resin on the microcapsule layer, covering a sheet(or film) before hardening the UV resin and last irradiating UV rays to harden it so as to complete the microcapsule sheet.

The sheet covered on the UV resin is usually made of polyester, polyethylene, polyvinylchloride etc.

As for the thickness of the covered sheet, thinner is better. 10 μm to 60 μm is desirable and 20 μm to 50 mμm is the best.

The sheet can be covered on the liquid UV resin at any time of after coating the liquid UV resin and before hardening it, for example, at the time of coating the liquid UV resin simultaneously, at the time of just after coating the liquid UV resin or at the time of start to harden the coated UV resin. The time of just after coating the liquid UV resin is suggested.

As regard to the UV rays used in the present invention, rays in UV wavelength, not specially limited, can be used as long as they can harden the coated UV curable resin. UV lamp or black lamp in the wavelength of 200 nm to 400 nm are the examples.

Irradiating time may be 5 seconds to 5 minutes and 5 seconds to 3 minutes is better and 20 seconds to 1 minute is the best.

At last, thus manufactured microcapsule display sheet is cut at desirable length. The microcapsules used in this invention are not specially limited.

Main Contents of the microcapsules are composed of solvents with low boiling point of 100° C. to 150° C. and viscosity of lower than 0.8 cps (at 25° C.), solvents with high boiling point of 240° C. to 350° C. and viscosity of 3 cps to 12 cps (at 25° C.), magnetic powders and nonmagnetic powders in the same size.

And the diameter of the microcapsules is smaller than 800 μm, 300 μm to 600 μm in average. An example of the method for preparing the microcapsules is described as follows.

(1) dispersing magnetic powders, nonmagnetic powders and dispersant in a gelatin aqueous solution and stirring them well at 20° C. to 60° C., (2) adding gum Arabic into the solution to regulate pH to acid and then cool it to lower than 20° C. to form a gelatin-arabic gum membrane, (3) curing the gelatin-arabic gum membrane to form microcapsules, (4) feltering it to delete the large microcapsules bigger than the average and remove water from the solution.

The solvent with low boiling point used in the invention has the boiling point of 100° C. to 150° C. and viscosity of lower than 0.8 cps.

Toluene, xylene, ortho-xylene, meta-xylene, para-xylene, ethylbenzene, ethylcyclohexane, 2-hexane etc. may be pointed out as the solvent with low boiling point. One or mixture of them may be used.

The solvent with high boiling point used in the invention has the boiling point of 240° C. to 350° C. and viscosity of 3 cps to 12 cps.

Dodecyl benzene, dipentyl benzene, diphenyl ether, benzil benzoate, diethyl phthalate are the examples. One alone or mixture of them can be used. Furthermore, compatibility of the solvent with low boiling point and the solvent with high boiling point has to be attentive.

Toluene and dodecyl benzene, xylene and dipentyl benzene, ethylbenzene and diphenyl ether, ethylcyclohexane and benzil benzoate are the combinations with good compatibility.

The magnetic powders used in the invention are well-known in the technical field, for example, black iron oxide, porous iron oxides, manganese dioxide-containing iron oxide, chrome dioxide, ferrite, iron or nickel fine powders, iron-nickel alloy that are all not affinity-reated are pointed out. Among them, synthetic magnetic iron oxide is suggested.

Diameter of the magnetic powders smaller than 5 μm is desirable, 0.1 μm to 3 μm is better. Titanium dioxide, lithopone, zinc oxide, basic lead carbonate, zinc sulfide can be used in the invention as the nonmagnetic powders. And anatase-type or rutile-type titanium dioxides are both used.

No limit is necessary to the size of the nonmagnetic powders used in the invention, as long as they can be dispersed enough. 0.1 μm to 1 μm is normal. A wide range of aqueous transparent adhesives can be used, specially each of water soluble urethane resin, water soluble aromatic polyester resin or water dispersive urethane resin is the example and water emulsion is the best.

The invented microcapsule magnetic display sheet records words or pictures by a magnet. This method is well known in the technical field.

In the present invention, a magnet having about 800 gauss is suggested which shows lines rapidly, clearly and distinctly.

While erasing the recorded words or pictures, using several weak magnets with 200 to 500 gauss together is effective. The recorded words and lines can be erased rapidly and clearly.

Therefore, it is very clear the present invention has the merits technically and economically. The invented microcapsule display sheet can be used in a wide range.

Picture books or toys for children, word-trainer, gameboard, memo board, disk mat, blackboard for meeting, memo board in clean room, photo-electric notice board, display panel for computer etc, are the examples.

EXAMPLES

The invention is described in more detail as follow and the examples here are only the description of the invention but does not limit the invention.

Example 1

FIG. 1 is a cross-sectional view of a coating device for manufacturing the invented microcapsule display sheet. In FIG. 1, belt conveyer 17 supported by the roller 10, 10 turn along the arrow direction. Film 6 drew out from roller 8 is put on the belt conveyer through roller 12. The film 6 is polyvinyl chloride film or polyethylene glycol terephthalate film.

The sheet 3, that is coated with a microcapsule layer thereon, is put on the film 6 passing through roller 12, 13. The liquid UV curable resin 7 is being coated on the microcapsule layer 31, by nozzle of hopper positioned over the belt conveyer 17 on the microcapsule layer 31.

Coating thickness is about 200 μm. The film 6 suffers spares of the coated liquid UV resin 7.

In this example, the liquid UV resin is prepared by mixing urethane acrylate 100 weight parts with benzoin ethyl ether 2 weight parts and its viscosity is regulated to be 4500±500 cps.

Then, the sheet 5 made of polyester (polyethylene glycol terephthalate film) and having thickness of 30 μm is covered on the coated liquid UV resin 7 from roller 9. And after that, the black lamps 41 (20 w, 40 units) irradiate the liquid UV resin from upper side to harden it. And the black lamps 42 (31 w, 10 units) irradiate the spares of the coated UV resin flowing on the film 6 from the lower side to harden it.

As the spares of the coated UV resins is not a large quantity, the film 6 can be separated easily later. While separating the film 6, a desirable microcapsule display sheet is cut and completed.

Figure 2:
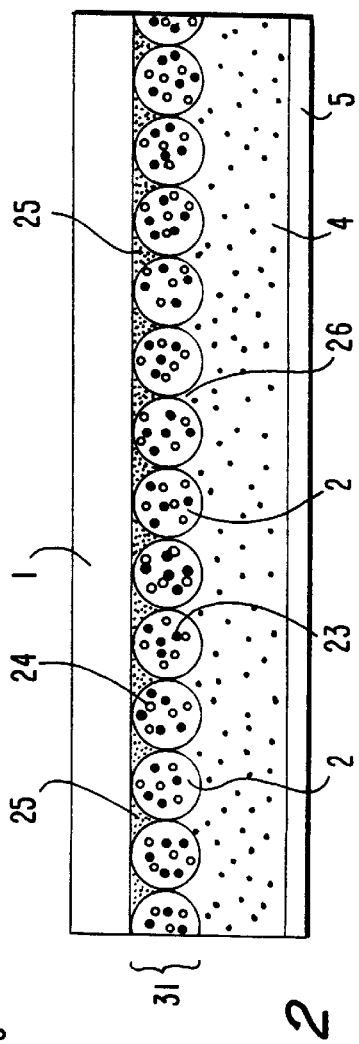
FIG. 2 is a cross sectional view of the invented microcapsule display sheet.

The microcapsule magnetic display sheet thus manufactured is shown in FIG. 2.

FIG. 2 is its cross sectional view. In FIG. 2, microcapsule layer 31 is coated on the transparent front sheet 1,and hollows 25 between the front sheet 1 and those coated microcapsules of the microcapsule layer 31 are filled by water transparent adhesives and the concave parts 26 between the UV resin layer 4 and the microcapsule layer 31 are filled by the UV resin.

Furthermore, a film 5 is covered on the UV resin layer in this example.

Thus, the microcapsule layer is completely supported and protected by the water adhesives filled in the hollows 25 formed between the front sheet and the microcapsules and the UV resin filled in the concave parts 26 formed in the other side between the microcapsule layer and the UV resin.

As the microcapsules 2 are completely protected from both sides, the microcapsule display sheet has wonderful durability and impact-resistance.

Figure 3:
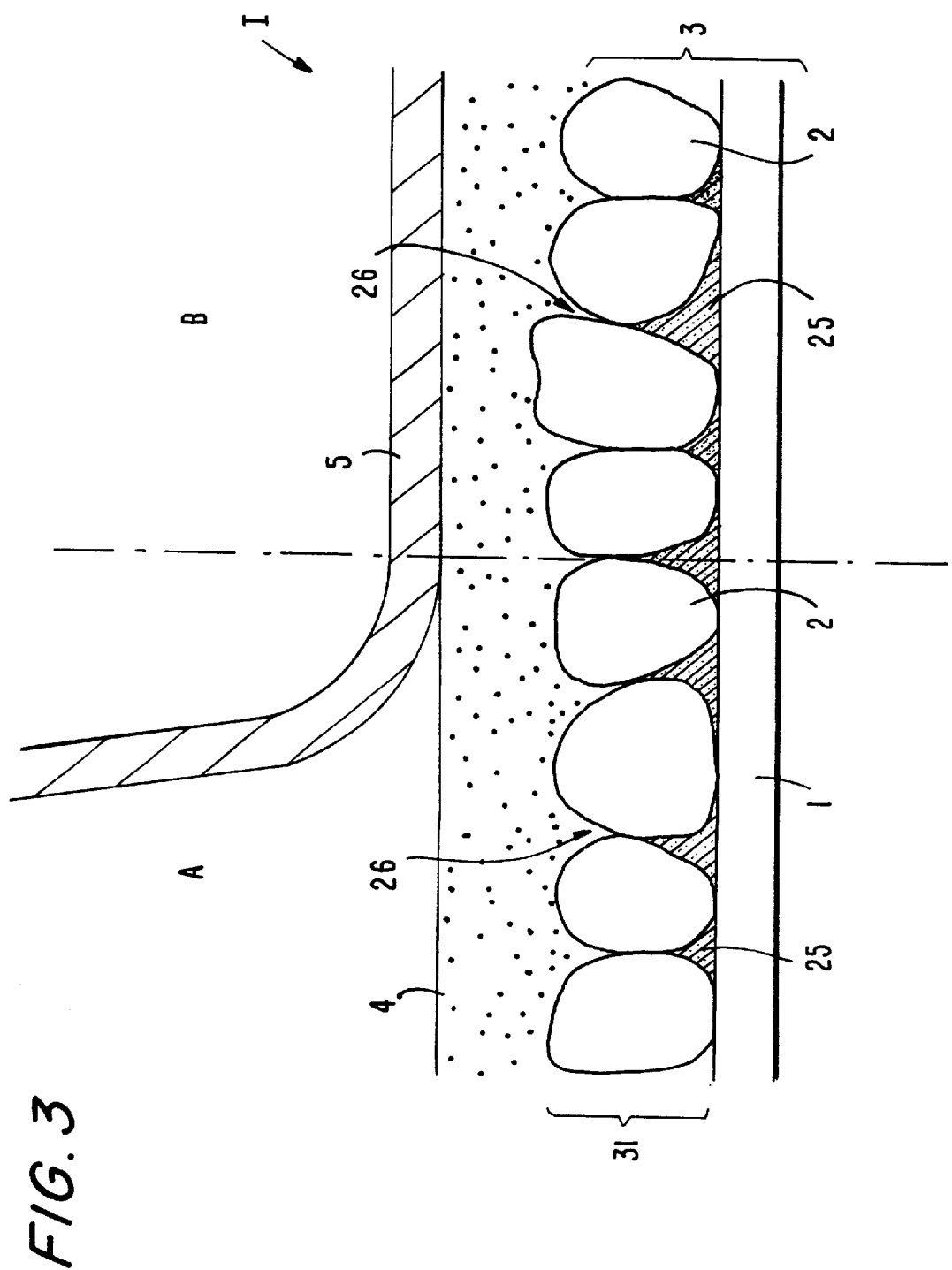
FIG. 3 is a cross sectional view of two embodiments of the invented microcapsule display sheet. Part A of the figure shows the microcapsule display sheet while the covered sheet separated and part B shows the microcapsule display sheet with the covered sheet thereon.

FIG. 3 is a cross sectional view of two embodiments of the invented microcapsule display sheet 1 manufactured by the invented method.

Namely, the film 5 may be separated from the UV resin layer shown in the part A of the figure as one embodiment and the film 5 may also be kept on the UV resin layer shown in the part B of the figure as the other embodiment of the invention.

The microcapsule layer 31 in this figure is coated on the transparent front sheet 1 by ink-like transparent adhesives.

As the ink-like transparent adhesives fill into the hollows 25, there are no gaps left. Also as the UV resin fill into the concave parts 26, there are no gaps left. In the embodiment of the film 5 being kept on the UV resin layer, the display sheet is rather hard with stiffness, and in the embodiment of the film being separated off, the display sheet is soft with flexibility. The invented microcapsule display sheet is optional according to different use.

Figure 4A:
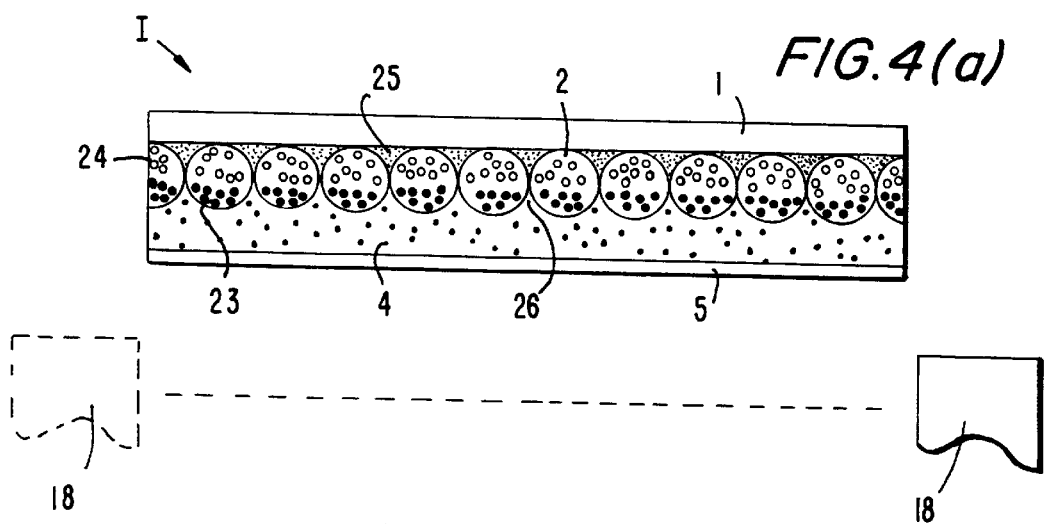
FIG. 4 is a cross sectional view of wording method of the invented microcapsule display sheet, 4(*a*) shows the case of sliding a magnet on back side of the magnetic sheet and 4(*b*) shows sliding a magnet on front side of the sheet.
Figure 4B:
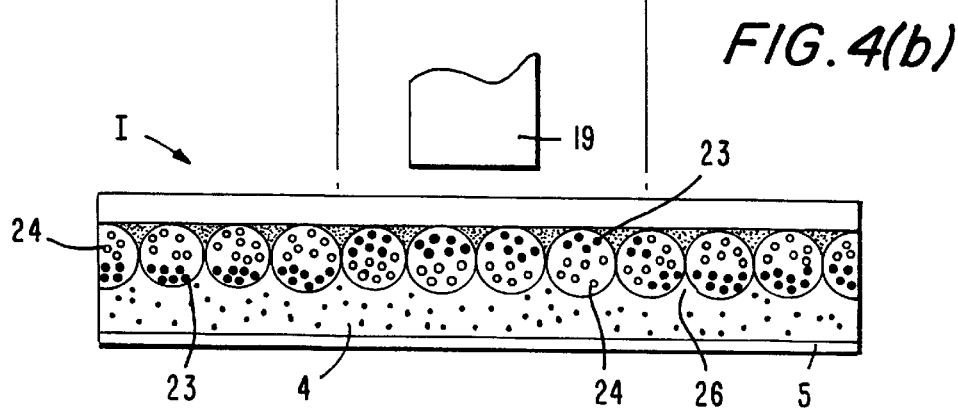
Figure 5:
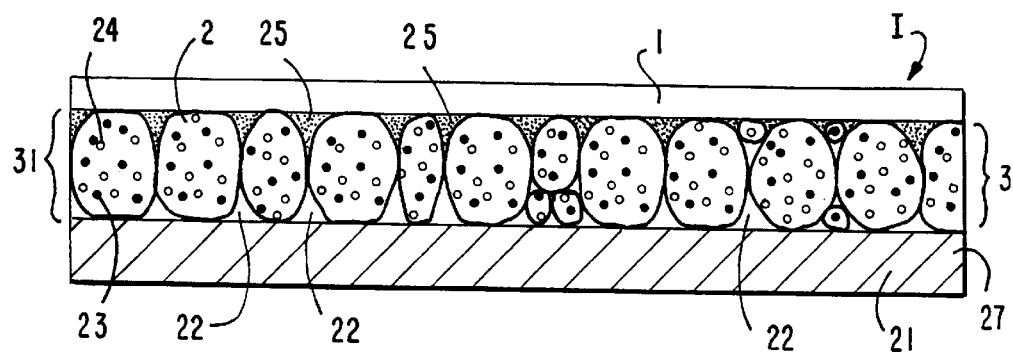
FIG. 5 is cross sectional view of traditional magnetic display sheet.

While explaining the wording method of the invented microcapsule display sheet 1, FIG. 4 is a cross sectional view of the sheet 1.

In the FIG. 4, (a) shows the state when a permanent magnet slips on back surface of the display sheet 1, and (b) shows the state when a magnetic pen writes words on the front surface of it.

When a permanent magnet 18 with magnetic force 200 gauss slips on the back side following the arrow in the figure just as like (a), the magnetic powders 23 inside the microcapsules 2 move towards to the UV resin layer (erasing operation).

In this state, as the black magnetic powders 23 move onto the UV side 4, the front surface of the sheet is white because only white nonmagnetic powders 24 exist in the front side. On the other hand, in the state (b), while wording words or pictures with a magnetic pen 19, distinct black words or pictures E appear on the front surface of the sheet thanks to the existence of the black magnetic powders.

Example 2

Microcapsule magnetic display sheet manufactured in example 1 by the invented method is compared with traditional microcapsule display sheet which is prepared by coating adhesives in 80 μm thickness on the back side and then laminating a film with 150 μm thickness on the adhesive layer in order to investigate the properties as impact-resistance, durability wording, erasing and word-keeping properties.

The investigated results are shown in table 1.

TEST METHOD OF IMPACT RESISTANCE

Putting a microcapsule display sheet on a concrete plate sticking a plastic tile thereon, dropping a steel-made ball in diameter of 25 mm and weight of 70 g directly on the microcapsule display sheets from 50 mm height to investigate, if the sheet is completely or partially destroyed.

TEST METHOD OF DURABILITY

Preparing a conoid in weight of 500 g and having a coning part in size of 1 mm and contacting the coning part directly with front surface of the test sheet to write lines of 50 mm length within one second repeatedly and continuously in the same place so as to investigate if there are some capsules destroyed.

TEST METHOD OF WORDING PROPERTY

Wording lines on surfaces of the test sheets with a magnetic pen having magnetic flux density of 750 gauss at wording speed of 20 cm per second to observe if the worded lines are distinct.

TEST METHOD OF ERASING PROPERTY

Sliding a permanent magnet composed of 7 sub-magnets and each of them is in size of 19 mm×122 mm, 1 mm(thickness) and has the magnetic flux density of 380 gauss at speed of 10 cm per second for one move back and forth to observe if the worded lines are erased completely.

TEST METHOD OF WORD-KEEPING PROPERTY

Writing words on surfaces of the test sheets with a magnetic pen having magnetic flux density of 750 gauss and keeping the test sheets at temperature of −10° C., moisture of 10% and temperature of 45° C., moisture of 90% was investigated for one month, respectively, to determine if any changes occurred in the written words.

TABLE 1

| TEST ITEMS | PRESENT INVENTION | TRADITIONAL SHEET |
| --- | --- | --- |
| WORDING PROPERTY | Wording lines are very distinct. | Wording lines are blurred and indistinct. |
| ERASING PROPERTY | Wording lines erased completely. | Some wording lines left. |
| WORD-KEEPING PROPERTY | | |
| Conditions: −10 ° C., 10% RH | No any changes observed. | No any changes observed. |
| Conditions: 45 ° C., 90% RH | No any changes observed. | Some of magnetic powders drop and the wording lines are indistinct. |
| DURABILITY | | |
| Some of capsules destroyed. | 53 rounds | 16 rounds |
| Almost of capsules destroyed. | 78 rounds | 25 rounds |
| IMPACT-RESISTANCE | No capsules destroyed. | Almost capsules destroyed. |

Example 3

The microcapsule display sheet is manufactured by the same method as the example 1 except thickness of the coated UV resin is 300 m. The microcapsule display sheet thus manufactured in example 3 is tested to investigate the properties.

As a results of the investigation, it is clarified that the sheet has very good wording property, erasing property as well as word-keeping property, has good impact resistance and good durability and the wording lines, pictures are quite distinct and clear.

Effects of the invention

As the invented microcapsule display sheet is sequentially provided thereon with a transparent surface sheet, a microcapsule layer painted on the surface sheet and a UV resin layer coated on the microcapsule layer, owing to the existence of the UV resin layer, while wording with a magnetic pen at normal wording speed, distinct and clear lines or pictures can be recorded and while erasing, the wording lines are completely erased and no lines left. And, the microcapsule display sheet is very good in durability and impact resistance.

In the present invention, the UV resin layer with thickness of 20 $\mu$m to 500 $\mu$m protects the microcapsules from pressure, impact or moisture.

According to the method for manufacturing the microcapsule display sheet, painting microcapsule dispersoid on a transparent sheet, drying it to form a microcapsule layer, then coating liquid UV resin on the dried microcapsule layer and irradiating it with UV lamps to harden it, as the liquid UV resin fills into fine gasp between the microcapsules, the capsules are completely protected and that results in good durability and good impact resistance.

In more detail, as no gaps formed between the microcapsules and the UV resin, the wording pressure is shared by the UV resin but not all suffered by the microcapsules.

Also according to the present invention, after coating the liquid UV resin on the microcapsule layer and before hardening it, covering a sheet on the UV resin to make it more smooth and stiff.

While the covered sheet separated the display sheet becomes soft.

What is claimed is:

1. Microcapsule magnetic display sheet forming a laminated structure composed of a transparent surface sheet; a microcapsule layer having a concave-convex surface topography containing multiple gaps or voids, and an ultraviolet-ray curable resin layer superimposed on the concave-convex surface of the microcapsule layer to fill the gaps with the laminated structure formed by the process of:

forming the microcapsule layer by drying a coating of microcapsule dispersoids, on said transparent surface sheet, thereby exposing said concave-convex surface on a front surface thereof, coating a UV curable resin in liquid form over concave-convex surface of the microcapsule layer so that the liquid resin penetrates and fills the gaps in the concave-convex surface of the microcapsule layer and curing the resin with ultraviolet radiation.

2. Microcapsule magnetic display sheet according to claim 1, wherein said ultraviolet-ray curable layer is in a thickness of 20 $\mu$m to 500 $\mu$m.

3. A method of manufacturing a microcapsule magnetic display comprising the steps of:

(1) coating microcapsule dispersoids on a transparent sheet, (2) drying the dispersoids to form a microcapsule layer having a front surface with a concave-convex surface topography containing multiple gaps and, (3) coating liquid ultraviolet-ray curable resin on the front surface of said microcapsule layer so that the liquid resin penetrates and fills the gaps in the concave-convex surface and irradiating it with UV rays just after coating to harden it so as to form a hardened UV ray curable resin layer.

4. A method of manufacturing the microcapsule magnetic display sheet according to claim 3, wherein a film is covered on the coated liquid UV ray curable resin before it is hardened.

5. A method of manufacturing the microcapsule magnetic display sheet according to claim 4, wherein said film covered on the UV curable resin is separable from said UV curable resin.

* * * * *